US008448225B2

(12) United States Patent
Kijima

(10) Patent No.: US 8,448,225 B2
(45) Date of Patent: May 21, 2013

(54) LOGIN PROCESS APPARATUS, LOGIN PROCESS METHOD, AND PROGRAM

(75) Inventor: Shigeo Kijima, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 344 days.

(21) Appl. No.: 12/726,451

(22) Filed: Mar. 18, 2010

(65) Prior Publication Data

US 2010/0251341 A1  Sep. 30, 2010

(30) Foreign Application Priority Data

Mar. 31, 2009  (JP) ................................. 2009-084071

(51) Int. Cl.
*G06F 7/04* (2006.01)
*G06F 11/00* (2006.01)

(52) U.S. Cl.
USPC ....... 726/4; 726/28; 726/29; 726/30; 713/170

(58) Field of Classification Search
USPC ........................................................... 726/4
See application file for complete search history.

(56) References Cited

U.S. PATENT DOCUMENTS

| 5,941,947 | A | * | 8/1999 | Brown et al. | 709/225 |
| 6,728,884 | B1 | * | 4/2004 | Lim | 726/12 |
| 7,974,857 | B1 | * | 7/2011 | Fischer et al. | 705/4 |
| 2006/0069915 | A1 | * | 3/2006 | Koeda | 713/168 |
| 2007/0233291 | A1 | * | 10/2007 | Herde et al. | 700/91 |
| 2008/0034411 | A1 | * | 2/2008 | Aoyama | 726/5 |

FOREIGN PATENT DOCUMENTS

| CN | 1571361 A | 1/2005 |
| CN | 1588839 A | 3/2005 |
| JP | 2006-350866 | 12/2006 |
| JP | 2008-040644 A | 2/2008 |

OTHER PUBLICATIONS

Chinese Office Action received in Chinese Application No. 201010150483 issued Feb. 5, 2013.

* cited by examiner

*Primary Examiner* — Taghi Arani
*Assistant Examiner* — Mohammad L Rahman
(74) *Attorney, Agent, or Firm* — Mattingly & Malur, PC

(57) ABSTRACT

An authority group definition that defines a combination of utilization authorities as an authority group, user information required to register local user information or to convert externally acquired user information into a format that is available, connection and authentication method information that defines a connection method and an authentication method for the external system etc., and authority conversion information required to map authority-related items of the externally acquired user information to the authority group. A login process section includes a login screen process section which allows a client PC to controllably display a login screen on an interface, a user information acquisition section which acquires user information from basic external operation systems and a local server, an authentication process section, a user information conversion process section, and a user information update process section.

9 Claims, 11 Drawing Sheets

FIG. 2

Authority group information (121)

| Authority group | Authority 1 | Authority 2 | Authority 3 | Authority 4 | Authority 5 | ... |
|---|---|---|---|---|---|---|
| A | ○ | ○ | ○ | ○ | ○ | ... |
| B | ○ | ○ | ○ | × | × | ... |
| C | ○ | ○ | × | × | × | ... |
| D | ○ | × | × | × | × | ... |
|   |   |   |   |   |   |   |

FIG. 3

Local user information (122)

| Registration source ID | User ID | User name | Password | Authority group | Application-specific information | Validity flag |
|---|---|---|---|---|---|---|
| 001 | HITTAR10 | Taro Hitachi | ****** | A | Registration condition, User-specific setting | 1 |
| 001 | HITHAN10 | Hanako Hitachi | ****** | B | Registration condition, User-specific setting | 0 |
| 002 | ichi-soft | Ichiro Sofuto | | A | Registration condition, User-specific setting | 1 |
| 002 | jiro-soft | Jiro Sofuto | | B | Registration condition, User-specific setting | 0 |
| 003 | kinyu01 | Ichihime Kinyu | | C | Registration condition, User-specific setting | 1 |
| 003 | kinyu02 | Nitaro Kinyu | | D | Registration condition, User-specific setting | 1 |
| | | | | | | |

User management information (A)

| User ID | User name | Password * | Authority | Start date | End date | ... |
|---|---|---|---|---|---|---|
| ichi-soft | Ichiro Sofuto | ****** | Authority X | 1998/01/01 | 9999/12/31 | ... |
| jiro-soft | Jiro Sofuto | ****** | Authority Y | 1998/04/01 | 9999/12/31 | ... |
| sab-soft | Saburo Sofuto | ****** | Authority W | 1998/04/01 | 2002/06/30 | ... |
| siro-soft | Shiro Sofuto | ****** | Authority Z | | | ... |
| | | | | | | |

Columns: 41, 42, 43, 44, 45, 46

* Password is encrypted before storage

FIG. 5

User management information (B)

| User ID | User name | Password | Authority | Authentication digest * | ... |
|---|---|---|---|---|---|
| kinyu01 | Ichihime Kinyu | 1k22ki4 | R1 | ****** | ... |
| kinyu02 | Nitaro Kinyu | 6a2bb!z | R2 | ****** | ... |
| kinyu03 | Hanako Kinyu | Kinkink | R3 | ****** | ... |
| kinyu04 | Shiro Kinyu | AAA12AA | R3 | ****** | ... |
| | | | | | |

Columns: 51, 52, 53, 54, 55

* Authentication digest corresponds to "User ID + Password" hashed by hash function

| Registration source ID | Registration source system name | Connection method | Acquired data item | Authentication method | Preset data | Validation method |
|---|---|---|---|---|---|---|
| 001 | Local | Local | User ID and Password | Password authentication | None | Validity flag = 1 |
| 002 | Basic operation system A | TCP/IP, SQL | User ID, Password, User name, Authority, Utilization start date, and Utilization end date | Password authentication (Encryption) | Decryption key | Utilization start date ≤ System date ≤ Utilization end date |
| 003 | Basic information system B | TCP/IP, SQL | User ID, User name, Authority, and Authentication digest | Match between authentication digests | Hash function | Always valid |
| | | | | | | |
| | | | | | | |

61 62 63 64 65 66 67

Authority conversion information table

| Registration source ID (71) | Registration source authority information (72) | Authority group (73) |
|---|---|---|
| 002 | Authority X | A |
| 002 | Authority Y | B |
| 002 | Authority Z | A |
| 002 | Authority W | B |
| 003 | R1 | C |
| 003 | R2 | D |
|  |  |  |

FIG. 13

| Message ID | Message |
|---|---|
| M01 | Enter user ID |
| M02 | Entered user ID is not present in registration source |
| M03 | User information cannot be correctly acquired. Contact application administrator |
| M04 | User authentication has failed. If you cannot log in with correct login password, contact application administrator |
| M05 | User is invalid and login has failed |
| M06 | Authority conversion has failed. Contact application administrator |
| M07 | User validity/invalidity check has failed. Contact application administrator |
| M08 | User is invalid and login has failed. If you can log into registration source system, contact application administrator |
| M09 | User in registration source is invalid and login to the system is also invalid. User-specific setting information is saved. If you want to continue to use the system, contact registration source system administrator. |
| M10 | User xx in registration source oo has been newly added as application user. Default values are set for user-specific setting information |
| M11 | You are allowed to utilize the application again. You can use your last user-specific setting information. If this is first time to utilize application, contact registration source system administrator. |
| M12 | Authority in registration source has been changed and so authority group has been updated from oo to XX. Functions and resources available in the system may be limited. If authority in registration source has not been changed, contact application administrator |
| M13 | User name has been updated from oo to xx |

LOGIN PROCESS APPARATUS, LOGIN PROCESS METHOD, AND PROGRAM

BACKGROUND OF THE INVENTION

1. Field of the Invention

The present invention relates to a login process technique, and in particular, to an application with a login function that can utilize user information in an external system.

2. Background Art

With the recent increased awareness of information security, application software dealing with confidential information very generally provides a login function. Such applications normally internally hold user information including information on authorities to access resources.

General applications internally holding user information and authority information contain a user ID, a login authentication password, a user name, authority information, and user-specific application setting information. The application executes a login process through authentication with the user ID, the password, and the like and utilizes the functions of the application within the range of the authorities.

In a system that utilizes a combination of various applications, managing users for each individual application results in complicated management and increased operation costs. One means for solving such a problem is to centralize management of user information. JP Patent Publication (Kokai) No. 2006-350866 A is a technical document that discloses such a method. The invention described in JP Patent Publication (Kokai) No. 2006-350866 A provides an authentication management system configured to allow single sign-on to be executed on a plurality of Web servers with respective independent authentication means without the need to change the system configuration of the existing Web server.

SUMMARY OF THE INVENTION

In such a system as described in JP Patent Publication (Kokai) No. 2006-350866 A, user information and authority information needs to be integrated or reset during installation. It is assumed that where a company or the like has already centralized unique user information using a basic operation system or the like, an application system is additionally introduced into the company. Then, if the single sign-on system is introduced into the company, the user information needs to be reset in association with the introduction.

However, it is unpractical in terms of costs to perform operations for shifting the user management and login authentication process of the already stably operating basic operation system to the single sign-on system or an integrated authentication infrastructure in order only to introduce the peripheral application. Thus, if the application is additionally introduced in this situation, it is important to enable a login process (user authentication and authority setting for the available functions of the application) to be executed utilizing user information in an external system such as the basic operation system with no change made to the configuration of the external system.

An object of the present invention is to provide an application having the function to execute the login process (user authentication and authority setting for the available functions of the application) utilizing the user information in the external system such as the basic operation system with no change made to the configuration of the external system.

An aspect of the present invention provides a server apparatus including a login process device and an application database, the application database including an authority group information database in which an authority group information is registered, the authority group information including a combination of utilization authorities in an application in the server apparatus as a user ID identifying a user terminal and an authority group indicating a set of specified authorities granted to each user by the login device and relating to functions available to the user and resources accessible to the user, a user information database in which user information corresponding to user management information converted into a format available in the server apparatus is registered, the user management information being acquired from an external system connected to the server apparatus and holding the user management information, the external system executing user management independent of the server apparatus, a connection and authentication method information database in which a connection method and an authentication method for the external system are defined, and authority conversion information required to map authority-related items of the user management information acquired from the external system to the authority group, the login process device including a login screen process section configured to controllably display a login screen on the user terminal, a user information acquisition section configured to acquire the user management information from the external system based on the connection and authentication method information, and a user information conversion process section configured to convert the acquired user management information into the format of the user management information which is available in the server apparatus.

Preferably, the user information includes at least a registration source ID identifying a registration source system in which the user information is registered, and the authority group, and a single piece of user information is uniquely identified based on a combination of the registration source ID and the user ID. Preferably, the user information conversion process section executes an authority information conversion process of using the authority conversion information to convert registration source authority information acquired from the user management information in the registration source into an authority group in the server apparatus. The user information conversion process section may acquire, in the authority conversion information, before updating of the authority group in the user information, the authority group with a record including the registration source ID matching the user's registration source ID and the registration source authority information matching the authority in the acquired data item so that the authority group is used as information required to update the authority group in the user information. In this case, no updating is executed.

In checking whether a user is valid or invalid, the user information conversion process section may acquire a validation method for the registration source ID from the connection and authentication method information and execute the user validity/invalidity check based on the method. Furthermore, if the user information conversion process section fails in the validity/invalidity check, the corresponding message may be displayed in a message dialog, and a login screen display process may be started. The server apparatus preferably includes a user information update process section configured to update the user information based on the registration source ID, the user ID and converted authority group both acquired from the registration source, and the result of the validity/invalidity check if the user information conversion process section succeeds in the validity/invalidity check. The server apparatus preferably includes an authentication process section configured to execute user authentication as a preprocess for the user information conversion process.

Preferably, the server apparatus further includes an application-specific process section configured to generate a local user, and a local user maintenance process section configured to execute a maintenance process including generation, updating, and deletion of the local user. Preferably, the user information conversion process section first determines whether or not the user is a local user. This process is first executed because the user information need not be subsequently converted or updated if the user is a local user.

Preferably, the login process section includes the login screen process section configured to controllably display the login screen on the user terminal, and acquires information input by the user and including a user ID (103), a password (104), and a registration source ID corresponding to a registration source (105) name selected via a dropdown list. Preferably, provided that the acquired user ID is not blank, the login process section terminates the login screen process, and carries over the user ID, password, and registration source ID input by the user to a succeeding user information acquisition process section to terminate the login screen process normally. If a plurality of the external systems are present, a registration source system name corresponding to the registration source ID is preferably set in the registration source on the login screen as an item in the dropdown list before the login screen is displayed.

Moreover, preferably, the server apparatus includes an authentication process section configured to execute user authentication, and the authentication process section takes over the password and registration source ID input by the user and all of the acquired data items acquired from the registration source, from the user information acquisition process section corresponding to a preprocess. Preferably, the authentication process section authenticates the user based on the input password and a password acquired from the registration source. Moreover, the user information preferably includes a flag indicating whether or not the user is currently valid.

The present invention may be a login system including the server apparatus described above, a user PC, and an external system.

Another aspect of the present invention provides a login method in a server apparatus including a login process device and an application database, the application database including an authority group information database in which an authority group information is registered, the authority group information including a combination of utilization authorities in an application in the server apparatus as a user ID identifying a user terminal and an authority group indicating a set of specified authorities granted to each user by the login device and relating to functions available to the user and resources accessible to the user, a user information database in which user information corresponding to user management information converted into a format available in the server apparatus is registered, the user management information being acquired from an external system connected to the server apparatus and holding the user management information, the external system executing user management independent of the server apparatus, a connection and authentication method information database in which a connection method and an authentication method for the external system are defined, and authority conversion information required to map authority-related items of the user management information acquired from the external system to the authority group, the method including a user information acquisition step of acquiring the user management information from the external system based on an input via a login screen display on the user terminal (PC) and the connection and authentication method information, and a user information conversion step of converting the acquired user management information into the format of the user management information which is available in the server apparatus.

Preferably, the user information includes at least a registration source ID identifying a registration source system in which the user information is registered, and the authority group, and a single piece of user information is uniquely identified based on a combination of the registration source ID and the user ID. Preferably, the user information conversion process step includes a step of executing an authority information conversion process of using the authority conversion information to convert registration source authority information acquired from the user management information in the registration source into an authority group in the server apparatus. Preferably, in the authority conversion information, the user information conversion process step includes a step of acquiring, before updating of the authority group in the user information, the authority group with a record including the registration source ID matching the user's registration source ID and the registration source authority information matching the authority for the acquired data item so that the authority group can be used as information required to update the authority group in the user information.

The present invention may be a program allowing a computer to execute any one of the above-described methods.

The application with the login function that can utilize the user information in the external system exerts the following effects.

The application can be provided which has the function to execute the login process (user authentication and authority setting for the available functions of the application) utilizing the user information in the external system such as the basic operation system with no change made to the configuration of the external system.

BRIEF DESCRIPTION OF THE DRAWINGS

FIG. 2 is a diagram of an example of a data configuration showing authority group information.

FIG. 3 is a diagram of an example of a data configuration showing user information.

FIG. 4 is a diagram showing an example of the data configuration of user management information in a first basic information system A.

FIG. 5 is a diagram showing an example of the data configuration of user management information in a second basic information system B.

FIG. 6 is a diagram showing an example of the data configuration of connection and authentication method information for a registration source system in which user information is registered.

FIG. 13 is a diagram of a list of messages showing examples of display messages used in a login section of the present application.

Figure 1:
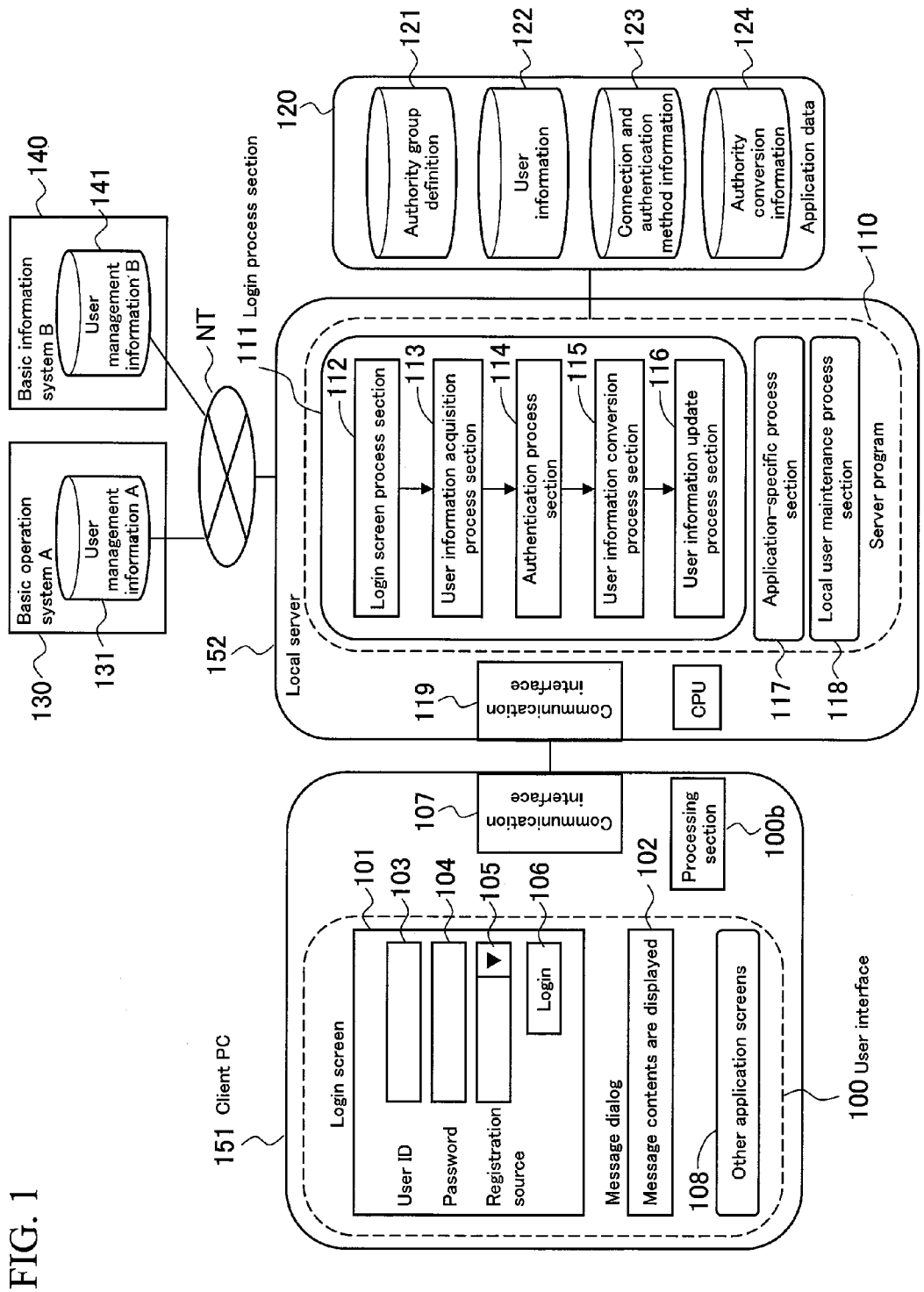
FIG. 1 is a diagram showing an example of the configuration of an application including a login process program according to an embodiment of the present invention.

DESCRIPTION OF SYMBOLS (100) User interface (UI)
(100b) Processing section
(101) Login screen
(102) Dialog
(107) Communication interface
(108) Other application screens
(110) Program
(111) Login process section
(117) Application-specific process section
(119) Communication interface
(118) Local user maintenance process section
(120) Application data
(130) Basic operation system A
(140) Basic information system B
(151) Client PC
(152) Local server

DETAILED DESCRIPTION OF THE PREFERRED EMBODIMENT

An embodiment of a system (hereinafter referred to as the "present system") to which the present invention is applied will be described; the system has a login function that can utilize user information in an external system.

FIG. 1 is a diagram showing an example of the configuration of the present system with the login function according to the embodiment of the present invention. In the system according to the present embodiment, an application program (hereinafter referred to as the "present application") with the login function (login process section 111) to make user information in external systems is composed of a user interface (100) including a login screen (101) that receives login information input by a user and dialog (102) that displays messages as well as additional application screens (108) for showing additional data, the user interface including a processing section (100b) and a communication interface (107), a server program 110 provided with a CPU and a communication interface (119) and including the login process section (111), a local user maintenance process section (118), and an application-specific process section (117), and application data (120) in which information to be utilized is stored. The server program 110 is executed by the CPU in a local server 152. The local server 152 is, for example, a server of a company which is accessed by client PCs via UIs. The user interface (UI) (100) belongs to a client PC 151 (terminal) with the processing section (100b), for example. Furthermore, the client PC 151 and the local server 152 communicate with each other via the communication interface (107) and the communication interface (119).

The local server 152 in the present application is connected to a basic operation system A (130) and a basic information system B (140) via a network NT; the basic operation system A (130) and the basic information system B (140) are external systems (external servers) different from an intracompany server or an outside server.

The basic operation system A holds user management information (DB) A (131), and the basic information system B holds user management information (DB) B (141). The basic operation system A and the basic information system B each manage users independently of the present application. The local server in the present application acquires user information from the external user management information (DB) A and the external user management information (DB) B. No change is made to the contents of the external user management information A and B.

In the present application, the local server is connected to the basic operation system A and the basic information system B through the NT via appropriate communication means such as an HTTPS which offers ensured security.

In the UI (100) in the client PC 151, the login screen (101) includes a user ID entry section (103), a password entry field (104), a user's registration source information entry field (105), and a login button (106) that allows a login operation to be performed.

Application data 120 in the local server is composed of an authority group definition (121) that defines a combination of utilization authorities in the present application as an authority group, user information (122) required to register local user information and to convert externally acquired user information into a format available in the present application and register the resultant user information, connection and authentication method information (123) that defines a connection method and an authentication method for the external systems or the like, and authority conversion information (124) required to map authority-related items of the externally acquired user information to the authority group in the present application.

The login process section (111) is composed of a login screen process section (112) configured to controllably display a login screen on the UI (100) in the client PC, a user information acquisition section (113) configured to acquire user information from the basic operation system (external system) (130), (140) and from the interior of the local server, an authentication process section (114) configured to authenticate users, a user information conversion process section (115) configured to convert acquired user information into a format of user information (122) which is used inside the local server, and a user information update process section (116) configured to reflect external user information in the internal user information (122).

External user information can be utilized in the present system. However, a application-specific process section (117) can also generate local users. A local user maintenance process section (118) can execute a maintenance process including the generation, updating, and deletion of the local users.

FIG. 2 is a diagram of a data configuration showing an example of the contents of information defined in the authority group definition (121) utilized in the present application in the local server. The present application is configured such that a set of given authorities can be granted for functions available to each user and resources accessible to each user. The authorities (22) (an authority 1, an authority 2, . . . ) involve functions available in the application and resources accessible in the application. For example, for an application that allows a database to be operated, the following are defined as individual authorities: functions such as a table referencing operation, a table updating operation, a table deleting operation, a table adding operation, and user management, or individual tables serving as accessible resources. The authority group (21) is defined as a combination of the presence and absence of the individual authorities.

Each circle in FIG. 2 indicates the possession of an authority. Each cross in FIG. 2 indicates the lack of an authority. Functions and resources available to a user who uses the present application in the local server are determined by giving the corresponding authority group to the user.

Authority group information may be preset during introduction of the present application in accordance with the utilization form. The authority group information may subsequently be appropriately changed depending on the utilization form or the like if required.

For example, the authority group 21 labeled as "A" indicates the possession of all of the authorities 1 to 5, that is, "A" indicates that the full access is possible. The authority group labeled as "B" indicates the possession of only the authorities 1 to 3; for example, "B" indicates that the full access to the present application is possible. The authority group 21 labeled as "C" indicates the possession of only the authorities 1 and 2; for example, "C" indicates that only the referencing of data in the present application is possible. The authority group labeled as "D" indicates the possession of the minimum authority, that is, only the authority 1.

FIG. 3 is a diagram showing an example of the data configuration of user information (122) utilized in the present application in the local server. A single piece of user information is described in one row and includes a registration source ID (31), a user ID (32), a user name (33), a password (34), an authority group (35), application-specific information (36), and a validity flag (37). A combination of the registration source ID (31) and the user ID (32) serves to uniquely identify a single piece of user information. The registration source ID (31) serves to identify a registration source system in which the user information is registered. In the present embodiment, the registration source ID "001" indicates that the user is registered in the local server itself for the present application. Such users are called local users, and the other users are called external users. The registration source ID (31) "002" corresponds to user information indicating that the user is registered in the external basic operation system A. The registration source ID (31) "003" corresponds to user information indicating that the user is registered in the external basic information system B. In the present embodiment, the present application is available to both local users and external users. However, the present application may be made available only to external users. In this case, the row for the registration source ID "001" is not present in FIG. 3. Furthermore, the number of registration source IDs (31) is not limited to three but may be appropriately changed depending on an increase or decrease in the number of external basic information systems.

The user ID (32) serves to uniquely identify the user in each registration source. The user name (33) indicates the user's name. The password (34) is set to allow a local user to be authenticated. The authority group (35) is set to be the same as the authority group (21) defined in FIG. 2. The application-specific information (36) can be freely set and saved in the application by the user. For example, for an application that allows a database to be operated, the application-specific information includes registered search conditions saved by the user, registered commonly-used functions, screen layout information, screen designs, and user-specific conditions.

The validity flag (37) indicates whether or not the user is currently valid. The validity flag set to 1 indicates that the user is valid. The validity flag set to 0 indicates that the user is invalid. If the validity flag is 1, the user can log into and utilize the present application. If the validity flag is 0, the user information is held in the application, but the user cannot utilize the application. In the present embodiment, including the user information with the validity flag is operationally convenient. This is because even if for example, the user's flag temporarily indicates invalidity to prevent the user from utilizing the application, subsequently setting the user to be valid again makes the application-specific information continuously available.

Addition or updating (or deletion) of user information is executed, for a local user, by the local user maintenance process section (118) in FIG. 1, and for an external user, by the user information update process section (116) in FIG. 1. Furthermore, the user information is appropriately referenced throughout the present system.

FIG. 4 is a diagram showing an example of the data configuration of the user management information A (131) in the basic operation system A shown in FIG. 1. In the example shown in the present embodiment, the user management information A (131) includes items of a user management table in a common basic operation system. The user management information A includes a user ID (41), a user name (42), a password (43), an authority (44), a start date (45), and an end date (46) for each user (in each user row). Each user data can be uniquely identified by the user ID. The password is encrypted before being saved. In the basic operation system A, for password authentication, a single decryption key prepared for the system is used to decrypt the password. Thus, the same decryption key as that used in the basic operation system A is preregistered in the system according to the present embodiment. The authority (44) allows the user to utilize the basic operation system A. Furthermore, the start date (45) is the date on which the user is allowed to start utilizing the basic operation system A. The end date (46) is the date on which the user ends the utilization. For example, given that the basic operation system belongs to a company, when an employee joins the company, the start date is set to be the date when the employee joins the company, and the end date is set to a sufficiently future date. When the employee retires from the company, the end date may be set to be the date when the employee retires from the company. Furthermore, preferably, when the employee takes administrative leave, the end date is set to be the date when the employee takes administrative leave. When the employee returns to work, the end date is set to a sufficiently future date. The user management information in the basic operation system thus generally includes the items such as the start date and the end date because even after the user loses the authority to utilize the operation system, data may need to be added up using the user ID or the user name may need to be displayed on a record.

FIG. 5 is a diagram showing an example of the data configuration of the user management information B (141) in the basic information system B. In the present example, the basic information system B is configured differently from the basic information system A. In the present embodiment, the user management information B includes a user ID (51), a user name (52), a password (53), an authority (54), and an authentication digest (55). The authority (54) allows the user to utilize the basic information system B. Furthermore, the authentication digest (55) is a string including the user ID with the password appended to the end thereof, the string being hashed by a single hash function prepared in the system. The basic information system B adopts matching of the authentication digest to allow the user to be authenticated. Thus, the same hash function as that used in the basic information system B is preregistered in the present system.

The data configurations shown in FIGS. 4 and 5 are illustrative, and any other data configuration may be used.

FIG. 6 is a diagram showing an example of the data configuration of the connection and authentication method information 123 for the registration source system in which user information is registered. The connection and authentication method information includes, for each user registration source, a registration source ID (61), a registration source system name (62), connection information (63) indicative of means for communication with the registration source system, a data item (64) acquired from the user management information in the registration source, a user authentication method (65), preset data (66) that is information prepared in the present system when the present system authenticates the user using the externally acquired user's data item, and a validation method (67) that allows setting of a method for determining whether or not the user is valid. All these items are preset when the present application is introduced. Furthermore, when a system corresponding to a user information registration source is added, information on the registration source is additionally set.

For example, the data in the first row is configured as follows. The data includes set values for the own local application program (local), that is, a data set from the local user maintenance process section (118) shown in FIG. 1. The registration source ID (61) is "001", and the registration source system name is local as also shown in FIG. 3. The acquired data item (64) is the user ID and the password. Furthermore, the validation method (67) is the validity flag.

The data in the second row is configured as follows. The registration source ID (61) is "002", and the registration source system name is the basic operation system A as also shown in FIG. 3. The acquired data item (64) is the user ID, the password, the user name, the authority, the utilization start date, and the utilization end date. A decryption key (66) for password authentication (encryption) (65) is preset. Furthermore, the validation method (67) is to compare a system date with the utilization start date and the utilization end date. The data in the third row is configured as follows. The registration source ID (61) is "003", and the registration source system name is the basic operation system B as also shown in FIG. 3. The acquired data item (64) is the user ID, the user name, and the authentication digest. Additionally, the authentication method (65) is to match the authentication digest, with a hash function preset. In addition, by way of example, the validation method (67) is specified such that the user is always valid. These items are set before introduction of a new application.

Figures 7, 8:
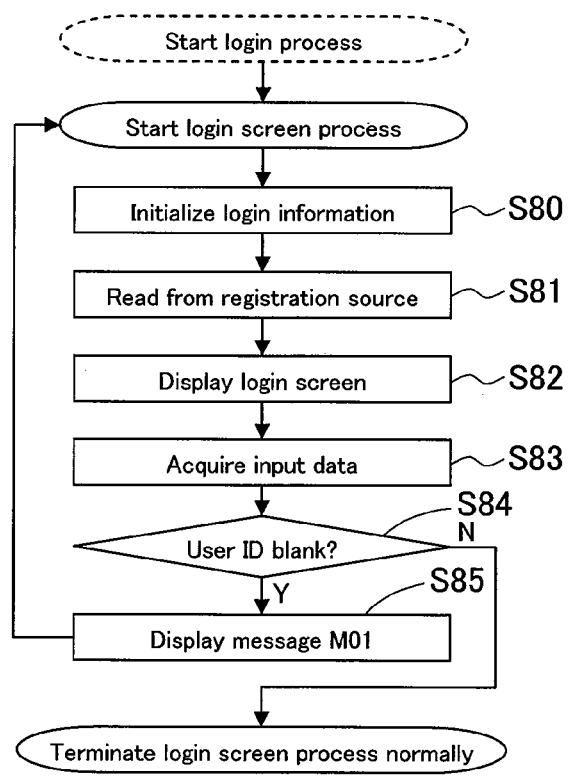
FIG. 7 is a diagram showing an example of the data configuration of authority conversion information.
FIG. 8 is a flowchart showing the flow of display of a login screen and a process (executed by a login screen process section) executed on data input via a screen.

FIG. 7 is a diagram showing the data configuration of authority conversion information 124 according to the present embodiment. The authority conversion information 124 includes registered mapping information required to convert the authorities 44 and 54 in the user information in the external systems A and B, into authority groups in the login process system according to the present embodiment. The authority conversion information 124 is composed of a registration source ID (71), preset registration source authority information (72), and an authority group (73) in the present system. For example, in the first row in FIG. 7, an authority X for the registration source ID=002 (basic operation system A) is mapped to the authority group (21) A in the present application shown in FIG. 2. An authority R1 for the registration source ID=003 (basic information system B) is mapped to the authority group (21) C in the present application shown in FIG. 2.

The user management information in the basic operation system normally includes at least one piece of information on the user's authority. Almost all of the authority information is roughly classified into the intensity at which the user can access the resource (for example, only reference, reference and update, and full access; see FIG. 2) and information on the ownership of the resource (for example, information indicating that the resource is owned by a personnel section, an accounting division, a design division, or a sales division).

Thus, a conversion table is prepared which is used to convert authority information in the registration source into an authority group in the present application. Hence, setting an authority group in the present application for each user is unnecessary, allowing authority groups to be automatically applied. This enables a reduction in time and effort required for user management. In contrast, if external users can log into the present invention but an authority group in the present application needs to be set for each user, time and effort required for this operation is almost the same as that required for definition of users for the present application. That is, the time and effort required for user management cannot be drastically reduced simply by allowing external users to log into the system. Automatically granting authorities enables a reduction in time and effort required for user management.

For the authority conversion information 124, when the present application is introduced into the local server, data is appended in accordance with the types of authorities in the registration source system. After appending the data, the authority conversion information 124 can be appropriately changed depending on a change in the authority system in the registration source, a change in the authority groups in the present system, a change in a rule for the correspondence between the authority groups in the registration source and the authority groups in the login authentication system according to the present embodiment.

FIG. 8 is a flowchart showing the flow of a process (executed by the login screen process section) in which the login screen is displayed and in which data is input via the screen, according to the present embodiment. A login screen process is executed after the present system has been started or if logout or an error occurs in the application-specific process section or if the login process section fails to log into the system.

In the present system, when the login screen process is started, the login process section (program) first initializes login information (step S80). The login process section (program) reads all combinations of registration source IDs and registration source names from the connection and authentication method information (123) (step S81). Then, the login process section sets the registration source system name corresponding to the registration source ID in the registration source (105) on the login screen as an item in a dropdown list. The login process section the displays the login screen (step S82).

The login process section (program) senses that the login button (106) also shown in FIG. 1 has been depressed. The login process section then acquires information input by the user including the user ID (103), the password (104), and the registration source ID corresponding to the registration source (105) name selected via the dropdown list (step S83).

If the user ID acquired is a blank, the program displays a message M01 ("Enter user ID") in the message dialog (102) and returns to the beginning of the login screen process (steps S84 and S85). If the user ID acquired is not a blank, the program terminates the login screen process and carries over the user ID, password, and registration source ID input by the user to the succeeding user information acquisition process section. Then, the program terminates the login screen process normally, and allows the user information acquisition process section (FIG. 1: 116) to start processing.

Figure 9:
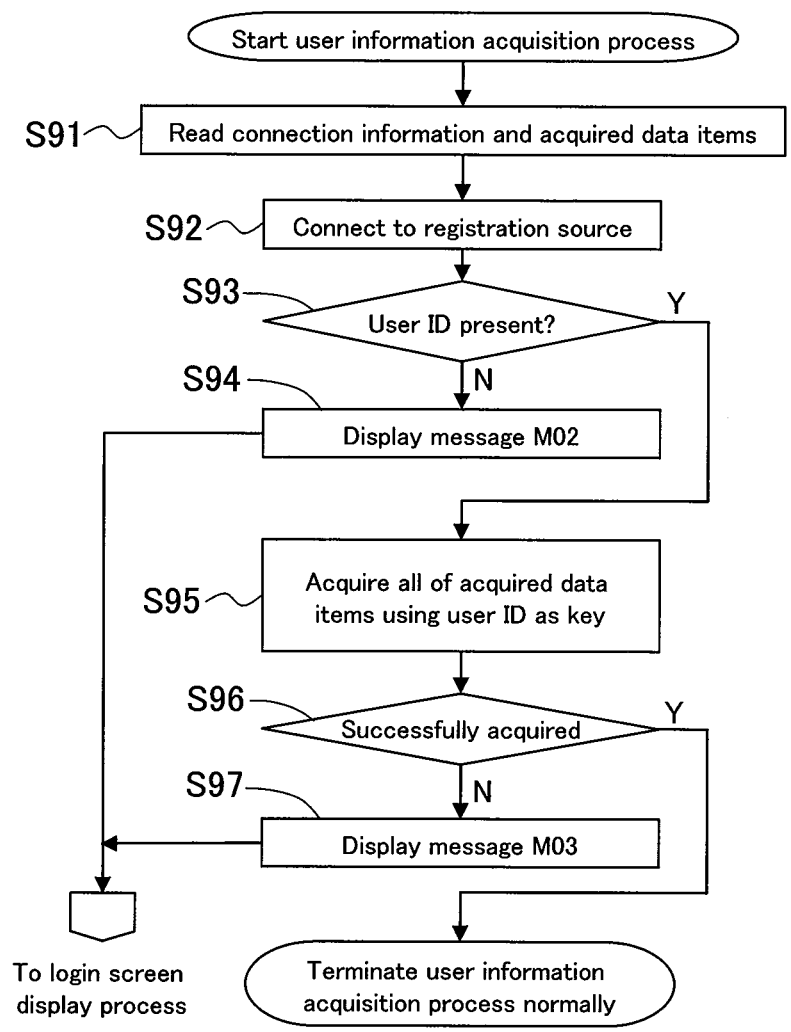
FIG. 9 is a flowchart of a process (executed by a user information acquisition process section) of acquiring user information required for login from local user information and user information in an external system corresponding to a registration source ID.

FIG. 9 is a flowchart showing a process (executed by the user information acquisition process section 116) of acquiring user information required for login from local user information and user information in the external system corresponding to the registration source ID.

Before the beginning of the process, as described above, the login screen process section (112) has carried over the information input by the user via the screen including the registration source ID, the user ID, and the password to the user information acquisition process section.

The user information acquisition process section (program) first acquires, from the connection and authentication method information (123), a connection method (63) corresponding to the registration source ID (61) input by the user, with reference to the table shown in FIG. 6 (step S91). Then, the user information acquisition process section (program) connects to the user management information in the registration source (step S92). The user information acquisition process section (program) then checks whether or not any user ID is present in the user management information in the registration source (step S93). For example, if registration source=basic operation system A and user ID=ichi-soft have been entered via the login screen (101) (see FIG. 3), the user information acquisition process section (program) selects a TCP/IP and SQL connection as a connection method in FIG. 6. The user information acquisition process section (program) then connects with the basic operation system in accordance with ANI TCP/IP. The user information acquisition process section (program) then issues an SQL statement to the user management information A table to determine whether or not data corresponding to user ID=ichi-soft is present therein.

If the result of the check for the user ID (step S93) indicates that the user ID is not present in the registration source (N), the program allows a message M02 ("Entered user ID is not present in registration source") or the like to be displayed in the message dialog (102) and starts a login screen display process (step S94).

If the user ID is present in the registration source (Y), the program uses the user ID as a search key to acquire the data items defined in the acquired data item (64) in the connection and authentication method information in FIG. 6, from the user management information in the registration source (step S95). If for example, registration source=basic system A and user ID=ichi-soft, the acquired data items are the user ID, the password, the user name, the authority, the utilization start date, and the utilization end date. The program then uses user ID=ichi-soft as a key to issue an SQL statement to user management information A (131) in the basic operation system to acquire the values of these items. The program thus acquires the values of the items.

Upon succeeding in acquiring the acquired data items (Y), the program carries over the password and registration source ID input by the user and all of the acquired data items acquired from the registration source to the succeeding authentication process section. The program thus terminates the user information acquisition process normally, and starts the authentication process section (114) (step S96).

Upon failing to acquire the acquired data items (N), the program displays a message M03 ("User information cannot be correctly acquired. Contact application administrator") in the message dialog 102 and starts the login screen display process (step S97).

Figure 10:
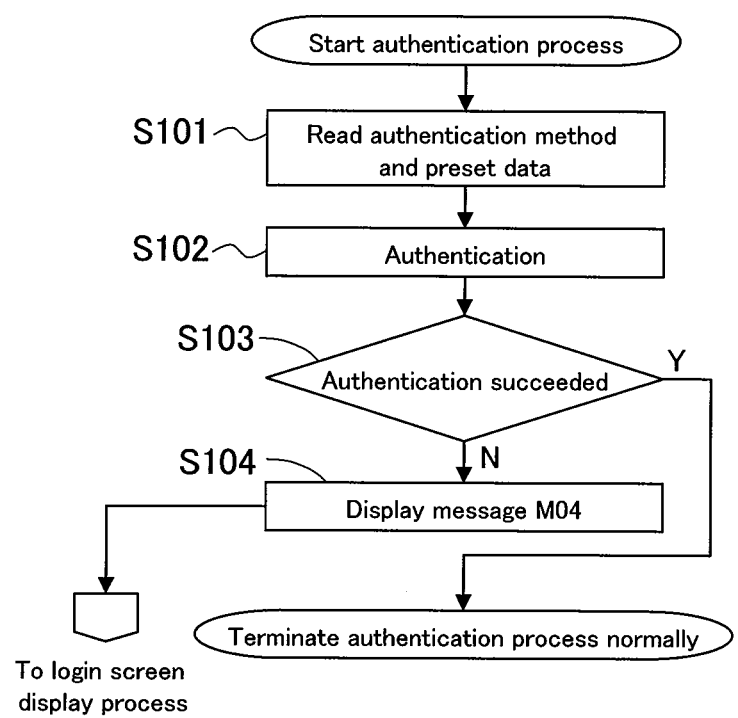
FIG. 10 is a flowchart showing a process (executed by an authentication process section) of authenticating a user based on information including a password input by the user and a password acquired from the registration source.

FIG. 10 is a flowchart showing the flow of a process (executed by the authentication process section) of authenticating the user based on the password input via the user's operation, the password acquired from the registration source, and the like.

Before the beginning of the present process, the user information acquisition section, which corresponds to the preprocess, has carried over the password and registration source ID input by the user and all of the acquired data items acquired from the registration source, to the authentication process section (114). The authentication process section (114) first reads particular items, that is, the authentication method (65) and preset data (66) corresponding to the registration source ID (61), from the connection and authentication method information in FIG. 6 (step S101). The authentication process section (114) then uses the information acquired from the registration source and the information defined in the preset data to perform authentication by the method described in the authentication method (65) (step S102). The authentication process section (114) then determines the results of the authentication (step S103).

An authentication procedure will be described taking, by way of example, three cases in which the user to be authenticated is registered in the local system, the basic operation system A, or the basic information system B, respectively. A library commonly used for authentication (S102) is assumed to be already incorporated into a program required for the authentication procedure.

If the user is registered in the local system, the program executes plaintext password authentication. In (S102), the program compares the password input by the user with the password acquired from the local user information (122). A match between the passwords means success in authentication. A mismatch between the passwords means failure in authentication.

If the user is registered in the basic operation system A, the program executes password authentication. Since the password (43) acquired from the user management information (A) is encrypted, the program decrypts the password using the decryption key in the preset data (66). The program then compares the decrypted password with the password input by the user. A match between the passwords means success in authentication. A mismatch between the passwords means failure in authentication.

If the user is registered in the basic information system B, the program executes password authentication. The program uses the hash function in the preset data (66) to hash the string including the user ID input by the user and to the end of which the password input by the user is appended. The program then compares the hashed string with the authentication digest (55) acquired from the user management information B. If the result of comparison indicates that the string matches the authentication digest (55), the authentication succeeds. If the result of comparison indicates that the string does not match the authentication digest (55), the authentication fails.

Through the above-described process, the program determines whether or not the authentication has succeeded (S103). If the authentication has not succeeded (N), the program displays a message M04 ("User authentication has failed. If you cannot login with correct login password, contact application administrator") in the message dialog (102) and starts the login screen process section (step S104). If the authentication has succeeded (Y), the program carries over the registration source ID and all of the acquired data items acquired from the registration source to the succeeding user information conversion process section (115). The program terminates the authentication process section normally, and starts the user information conversion process section.

Figure 11:
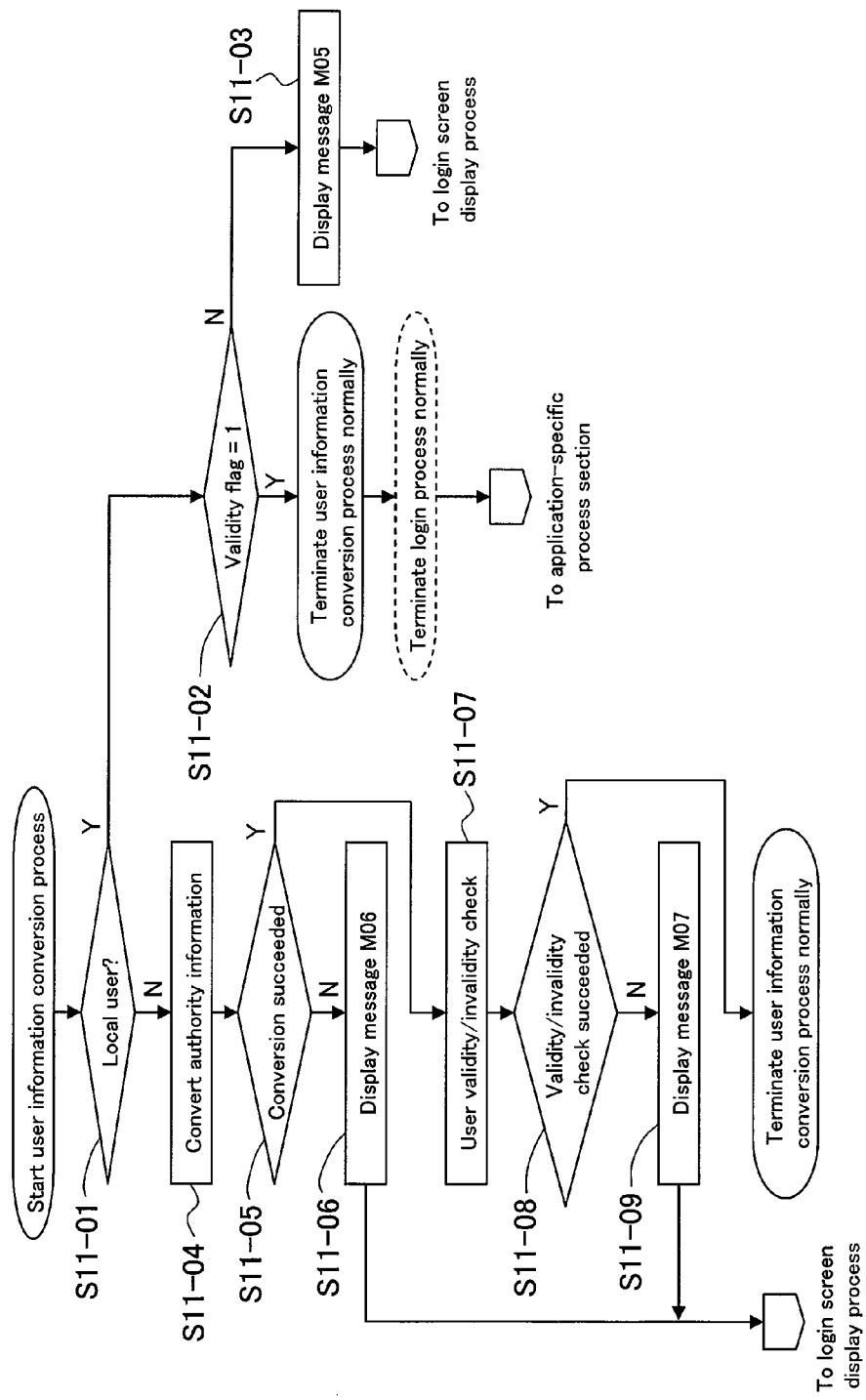
FIG. 11 is a flowchart showing a process (executed by a user information conversion process section) of converting acquired user information into a format of internal user information.

FIG. 11 is a flowchart showing the flow of a process (executed by the user information conversion process section (115)) of converting the acquired user information into the format of the internal user information (122). Before the beginning of the present process, the authentication process section, which corresponds to the preprocess, has carried over the registration source ID and all of the acquired data items acquired from the registration source, to the user information conversion process section (115).

In a user information update process, the program determines whether or not the user is a local user based on the registration source ID (step S11-01). If the user is a local user (Y), the program determines whether or not the validity flag (37) in the user information is "1" (step S11-02). If the validity flag (37) is "1" (Y), the program determines the user to be valid, and terminates the user information conversion process and the login process normally. The program then starts the succeeding application-specific process section (117). Thus, the user has successfully logged in.

If the user is a local user and the validity flag (37) in the user information is not "1" (N), the program displays a message M05 ("User is invalid and login has failed") in the message dialog (102) (step S11-03). The program then starts the login screen display process.

The program first executes the process of determining whether or not the user is a local user (step S11-01) because the local user does not require the conversion or updating of the user information in the subsequent processing. The user information update process for the local user is executed by the local user maintenance process section (118) independently of the login process section (111). Furthermore, the processing in (steps S11-01, S11-02, and S11-03) may be implemented between the authentication process section (114) and the user information conversion process section (115). Additionally, the processing may be omitted provided that no local user is used.

If the result of the determination in (step S11-01) indicates that the user is not a local user (NO), the program executes an authority information conversion, a process of using authority conversion information to convert the user's authorities acquired from the user management information in the registration source into an authority group in the present application (step S11-04). In the authority information conversion, the program acquires information required to update the authority group (35) in the user information and corresponding to the authority group (73) with a record including the registration source ID (71) from the authority conversion information (124) which matches the user's registration source ID, and the registration source authority information (72) matching the authorities in the acquired data item (64) acquired in step 95 (here, no updating is executed).

In the following description, it is assumed that user ID=ichi-soft registered in the user management information A logs into the present system, by way of example. The connection and authentication method information (123) in FIG. 6 shows that the registration source ID of the user ichi-soft is "002". The authority (44) shows that the authority, in the registration source system, of the user ichi-soft in FIG. 4 is the "authority X". Thus, based on the authority conversion information in FIG. 7, the user ichi-soft's authority group is determined to be "A" as shown in the first row in FIG. 7.

Then, the program determines whether or not the conversion has succeeded (step S11-05). If the conversion of the authority has failed owing to the inappropriate setting of the authority conversion information, the program displays a message M06 ("Authority conversion has failed. Contact application administrator") in the message dialog (102) (step S11-06). The program then starts the login screen display process.

If the conversion has succeeded, the program executes a user validity/invalidity check to determine whether or not the user management information in the registration source system indicates that the user is valid (step S11-07).

In the user validity/invalidity check (step S11-07), the program first acquires the validation method (67) for the corresponding registration source ID from the connection and authentication method information. Then, based on the method, the program checks whether the user is valid or invalid.

The check procedure will be described taking, by way of example, cases where the registration source system for the user on which the user validity/invalidity check is executed is the basic operation system A or the basic operation system B, respectively. A program required for the user validity/invalidity check is incorporated for each individual registration source ID.

If the user's registration source is the basic operation system A, the program acquires the system date of the present application. If the system date is later than the utilization start date acquired from the data item (64) and earlier than the utilization end date acquired from the data item (64) (see 45 and 46 in FIGS. 4 and 67 in FIG. 6), then the program determines the user to be valid (Y). Otherwise, the program determines the user to be invalid (N).

If the user's registration source is the basic information system B, since the user management information B in the basic information system B has no concept of user's validity/invalidity, no information allowing the user to be determined to be valid or invalid is set in the acquired data item (64) (see FIG. 6). Thus, a method of always determining that the user is valid is set in the validation method (67). Hence, based on the validation method (67) for the connection and authentication method information, the user is always determined to be valid.

If the validity/invalidity check has failed (N), the program displays a message M07 ("User validity/invalidity check has failed. Contact application administrator") in the message dialog (102) (steps S11-08 and S11-09). The program then starts the login screen display process.

If the validity/invalidity check has succeeded (step S11-08) (Y), the program carries over the registration source ID, the user ID and user name acquired from the registration source, the authority group converted in (step S11-04), and the result of the validity/invalidity check, to the succeeding user information update process section (116). The program then terminates the user information conversion process normally and starts the user information update process section.

Figure 12:
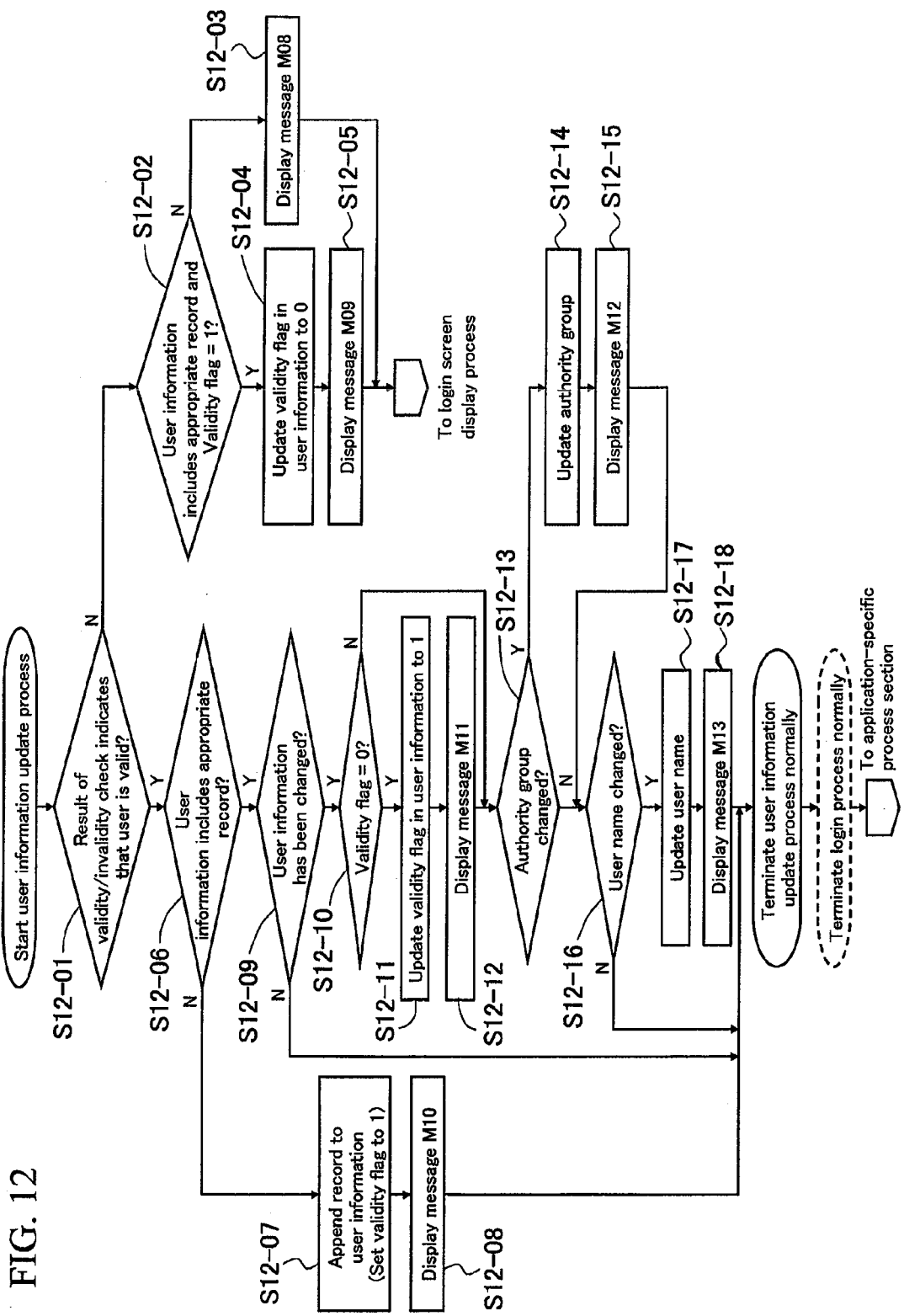
FIG. 12 is a flowchart showing a process (executed by a user information update process section) of updating user information in the application with externally acquired user information.

FIG. 12 is a flowchart showing the flow of a process (executed by the user information update process section 116) of updating the user information (122) in the present application with externally acquired user information. Before the beginning of the present process, the user information conversion process section (115), which corresponds to the preprocess, has carried over the registration source ID, the user ID and user name acquired from the registration source, the converted authority group, and the result of the validity/invalidity check, to the user information update process section (116).

First, it is assumed that the result of the validity/invalidity check indicates that the user is invalid (step S12-01) (N), the user information includes a record that matches the set of the registration source ID and user ID carried over from the preprocess section, and the validity flag in the record is not 1 (step S12-02) (N). Then, the user attempting to log in is invalid, and the validity flag in the user information is "0". Thus, the user information is not updated and the program displays a message M08 ("User is invalid and login has failed. If you can log into registration source system, contact application administrator") in the message dialog (102) (step S12-03). The program then starts the login screen display process.

Then, it is assumed that the result of the validity/invalidity check indicates that the user is invalid (step S12-01) (N), the user information includes a record that matches the set of the registration source ID and user ID carried over from the preprocess section, and the validity flag in the record is 1 (step S12-02) (Y). Then, the user attempting to log in is invalid, but the validity flag in the user information remains "1". Thus, the program updates the validity flag in the user information to "0" to inhibit the user from logging in (step S12-04). The program then displays a message M09 ("User in registration source is invalid and login to the system is also invalid. User-specific setting information is saved. If you want to continue to use the system, contact registration source system administrator.") in the message dialog (102) (step S12-05). The program then starts the login screen display process.

Then, it is assumed that the result of the validity/invalidity check indicates that the user is valid (step S12-01) (Y) and the user information includes no record that matches the set of the registration source ID and user ID carried over from the preprocess section (step S12-06) (N). Then, information on the external user attempting to log in needs to be registered in the user information. Thus, the program appends a record to the user information (S12-07). When the record is appended, the program sets the registration source ID, user name, and authority group carried over from the preprocess section, in the registration source ID (31), user name, and authority group in the user information, respectively. The program further keeps the password (34) blank, and sets the application-specific information (36) and the validity flag to a default value and 1, respectively. The program then displays a message M10 ("User xx in registration source oo has been newly added as application user. Default values are set for user-specific setting information") in the message dialog (102) (step S12-08). The program then terminates the user information update process and the login process normally and starts the application-specific process section. In the oo portion, the corresponding registration source system name (62) is displayed. In the xx portion, the user ID is displayed. Thus, the user has successfully logged into the present application.

Now, a process executed in the following case will be described below: the result of the validity/invalidity check indicates that the user is valid (step S12-01) (Y), and the user information includes a record that matches the set of the registration source ID and user ID carried over from the preprocess section (Y in step S12-06). If the user information has not been changed (N in step S12-09), that is, if the information carried over from the preprocess section matches the corresponding contents of the user information, then the user information need not be updated. Thus, the program terminates the user information update process and the login process normally and starts the application-specific process section. Thus, the user has successfully logged into the present application. If the user information has been changed (Y in step S12-09) and the validity flag in the user information is "0" (step S12-10) (Y), then the user in the registration source is valid, and the validity flag in the user information in the present application is "0" (invalid). Hence, the program updates the validity flag in the user information to "1" (step S12-11). Then, the program displays a message M11 ("You are allowed to utilize the application again. You can use your last user-specific setting information. If this is the first time you are using the application, contact registration source system administrator.") in the message dialog (102) (step S12-12). The program then continues to execute processing in (step S12-13).

If the user information has been changed (Y in step S12-09) and the validity flag in the user information is not "0" (step S12-10) (N), the program continues to execute the processing in (step S12-13).

If the authority group has been changed (Y in step S12-13), the program updates the authority group (35) in the user information with the authority group carried over from the preprocess section (step S12-14). The program then displays a message M12 ("Authority in registration source has been changed, and so authority group has been changed from oo to XX. Functions and resources available in the system may be limited. If authority in registration source has not been changed, contact application administrator") in the message dialog (102) (step S12-15). The program then continues to execute processing in (step S12-16). In oo in the message M12, the unupdated authority group is displayed. In XX in the message M12, the updated authority group is displayed.

If the authority group has not been changed (N in step S12-13), the program continues to execute the processing in (step S12-16).

In (step S12-16), if the user name has been changed (Y), the program updates the user name (33) in the user information with the user name carried over from the preprocess section (step S12-17). The program then displays a message M13 ("User name has been updated from oo to xx") in the message dialog (102) (step S12-18). In oo in the message M13, the unupdated user name is displayed. In xx in the message M13, the updated user name is displayed. The program terminates the user information update process and the login process normally and starts the application-specific process section. Thus, the user has successfully logged into the present application.

In (step S12-16), if the user name has been unchanged (N), the program terminates the user information update process and the login process normally and starts the application-specific process section. Thus, the user has successfully logged into the present application.

FIG. 13 is a message list showing examples of display messages used in the login section of the present application. A user of an external system can log into the present application. Thus, it is important to clearly determine whether a login error results from the settings in the present application or from the user information in the registration source system, in terms of how the user deals with the error. In the messages used in the present application, the expression "contact application administrator" is used if the phenomenon results from the settings in the present application. In contrast, the expression "contact registration source system administrator" is used if the phenomenon results from, for example, the information in the registration source system. Thus, when a login error occurs, the application can let the user know with whom the user may get into contact.

In the present embodiment, the following implementation example has been shown. First, the program checks whether or not the user ID is present in the user management information in each registration source. Then, the program acquires the information required for authentication and login from the user management information. The program then executes the authentication process inside the present system in accordance with the preregistered procedure. However, the present invention is not limited to this implementation example.

As described above, the embodiment of the present invention provides the application with the login function that can utilize the user information in the external system. Thus, the present invention can provide an application having the function to execute the login process (user authentication and authority setting for the available functions of the application) utilizing the user information in the external system such as the basic operation system with no change made to the configuration of the external system.

The apparatus and method according to the present embodiment are not limited to the above-described illustrated examples. Of course, various changes may be made to the examples without departing from the spirit of the present invention. Furthermore, the processing in each of the sections of the program required to implement the functions described in the embodiment may be executed as follows. The program is recorded in a computer-readable recording medium. The program recorded in the recording medium is loaded into a computer system. The computer system then executes the program.

The present invention is applicable to authentication apparatuses.

What is claimed is:

1. A login process apparatus comprising: a login process section configured to execute a login process on an application program and an application database used by the application program, where the application database has:

an authority group information database in which authority group information is registered, the authority group information including a combination of utilization authorities in the application program defined as an authority group without information which specifies a user and indicating a set of specified authorities and relating to functions and resources available upon authentication, a user information database in which user information corresponding to user management information converted into a format available in the application program is registered, the user management information being acquired from an external system connected to the login process apparatus and holding the user management information, the external system executing user management independent of the login process apparatus, a connection and authentication method information database in which a connection method and an authentication method for the external system are defined, an authority conversion database in which authority conversion information required to map authority-related items of the user management information acquired from the external system to the authority group is defined, a user information acquisition section configured to acquire the user management information from the external system based on the connection and authentication method information, and a user information conversion process section configured to convert the acquired user management information into the format of the user management information which is available in the application program, wherein the login process apparatus further comprises a login screen process section configured to controllably display a login screen on a user terminal, wherein the user information comprises at least a registration source ID identifying a registration source system in which the user information is registered, and the authority group, and a single piece of user information is uniquely identified based on a combination of the registration source ID and a user ID, wherein the user information conversion process section executes an authority information conversion process of using the authority conversion information to convert registration source authority information acquired from the user management information in the registration source into an authority group in the login process apparatus, and wherein the user information conversion process section acquires, in the authority conversion information, before updating of the authority group in the user information, the authority group with a record including the registration source ID matching the user's registration source ID and the registration source authority information matching the authority in the acquired data item so that the authority group is used as information required to update the authority group in the user information.

2. The login process apparatus according to claim 1, wherein in checking whether a user is valid or invalid, the user information conversion process section acquires a validation method for the registration source ID from the connection and authentication method information and executes the user validity/invalidity check based on the method.

3. The login process apparatus according to claim 2, further comprising a user information update process section configured to update the user information based on the registration source ID, the user ID and converted authority group both acquired from the registration source, and the result of the validity/invalidity check if the user information conversion process section succeeds in the validity/invalidity check.

4. The login process apparatus according to claim 1, further comprising an application-specific process section configured to generate a local user, and a local user maintenance process section configured to execute a maintenance process including generation, updating, and deletion of the local user.

5. The login process apparatus according to claim 1, wherein the login process section comprises the login screen process section configured to controllably display the login screen on the user terminal, and acquires information input by the user and including a user ID, a password, and a registration source ID corresponding to a registration source name selected via a dropdown list, and provided that the acquired user ID is not blank, the login process section terminates the login screen process, and carries over the user ID, password, and registration source ID input by the user to a succeeding user information acquisition process section to terminate the login screen process normally.

6. The login process apparatus according to claim 5, wherein if a plurality of the external systems are present, a registration source system name corresponding to the registration source ID is set in the registration source on the login screen as an item in the dropdown list before the login screen is displayed.

7. The login process apparatus according to claim 1, further comprising an authentication process section configured to execute user authentication, wherein the authentication process section takes over the password and registration source ID input by the user and all of the acquired data items acquired from the registration source, from the user information acquisition process section corresponding to a preprocess, and the authentication process section authenticates the user based on the input password and a password acquired from the registration source.

8. A login process method in a login process apparatus which has a login process section configured to execute a login process on an application program and an application database used by the application program, the application database having an authority group information database in which authority group information is registered, the authority group information including a combination of utilization authorities in an application in the login process apparatus as a user ID identifying a user terminal and an authority group indicating a set of specified authorities and relating to functions and resources available upon authentication, a user information database in which user information corresponding to user management information converted into a format available in the login process apparatus is registered, the user management information being acquired from an external system connected to the login process apparatus and holding the user management information, the external system executing user management independent of the login process apparatus, a connection and authentication method information database in which a connection method and an authentication method for the external system are defined, and authority conversion information required to map authority-related items of the user management information acquired from the external system to the authority group without information which specifies a user, the login process method comprising:

- a user information acquisition step of acquiring the user management information from the external system based on an input via a login screen displayed on a user terminal and the connection and authentication method information; and
- a user information conversion step of converting the acquired user management information into a format of the user management information which is available in the login process apparatus, wherein the user information comprises at least a registration source ID identifying a registration source system in which the user information is registered, and the authority group, and a single piece of user information is uniquely identified based on a combination of the registration source ID and the user ID, wherein the user information conversion process step further comprises executing an authority information conversion process using the authority conversion information to convert registration source authority information acquired from the user management information in a registration source into an authority group in the login process apparatus, and wherein the user information conversion process step comprises a step of acquiring, in the authority conversion information, before updating of the authority group in the user information, the authority group with a record including the registration source ID matching the user's registration source ID and the registration source authority information matching the authority for the acquired data item so that the authority group can be used as information required to update the authority group in the user information.

9. A login process program stored on a non-transitory computer readable medium allowing a computer to execute the method according to claim 8 using a login process apparatus.

\* \* \* \* \*